April 26, 1960     W. T. GLOOR     2,933,921
MATERIALS TESTING MACHINE
Filed Sept. 30, 1958     4 Sheets-Sheet 1

INVENTOR
WILBUR T GLOOR
BY ATTORNEY

April 26, 1960 W. T. GLOOR 2,933,921
MATERIALS TESTING MACHINE
Filed Sept. 30, 1958 4 Sheets-Sheet 2

INVENTOR.
WILBUR T. GLOOR
BY
ATTORNEY

April 26, 1960 W. T. GLOOR 2,933,921
MATERIALS TESTING MACHINE
Filed Sept. 30, 1958 4 Sheets-Sheet 3

*INVENTOR.*
WILBUR T. GLOOR
BY
ATTORNEY

INVENTOR.
WILBUR T. GLOOR
BY
ATTORNEY

United States Patent Office 2,933,921
Patented Apr. 26, 1960

2,933,921

MATERIALS TESTING MACHINE

Wilbur T. Gloor, Sudbury, Mass., assignor to Baldwin-Lima-Hamilton Corporation, a corporation of Pennsylvania Application September 30, 1958, Serial No. 764,297

6 Claims. (Cl. 73—93)

This invention relates to tension-compression materials testing machines of the screw loading type.

One of the principal difficulties in materials testing machines has been the inability to provide a high degree of rigidity in the straining structure. This instability or lack of rigidity becomes particularly objectionable if angular and/or eccentric loading occurs during the test, as so frequently happens. Various arrangements heretofore proposed and used in an effort to reduce these difficulties have been deficient either economically, functionally, or structurally. In addition to overcoming these difficulties it has been desirable to provide a single test space for tension and compression specimens where the center of the specimen space does not move during a test. But machines heretofore arranged for a single test space have not maintained a constant center and have had unstable straining structures as well as being deficient in other respects.

It is an object of my invention to provide an improved screw-type universal testing machine (i.e., for testing both tension and compression specimens) in which the straining elements are so combined as to provide the desirable feature of a single space whose specimen center remains constant at all times at a convenient height while at the same time containing a high degree of stability of the straining structure.

A further object is to provide an improved screw-type universal materials testing machine that is adapted to employ electrically sensitive load-weighing cells in such a manner that they have a high degree of freedom from distortion and from other adverse conditions during loading of the straining structure.

A still further object is to provide an improved screw-type universal materials testing machine that is relatively simple in construction, operation and maintenance and has a high degree of ruggedness combined with the ability to use electrical strain-sensitive load cells that are so arranged with respect to the screws and nuts as to minimize or eliminate transmission to the load cells of bending effects or other distortions that may arise in the straining structure.

An additional object is to provide a straining system in a universal testing machine in which the test load is limited to the loading crossheads and to only that portion of the screws lying between the crossheads, whereby the test load is not transmitted to other supporting members.

Other objects and advantages will be more apparent to those skilled in the art from the following description of the accompanying drawings in which.

Figures 1, 2:
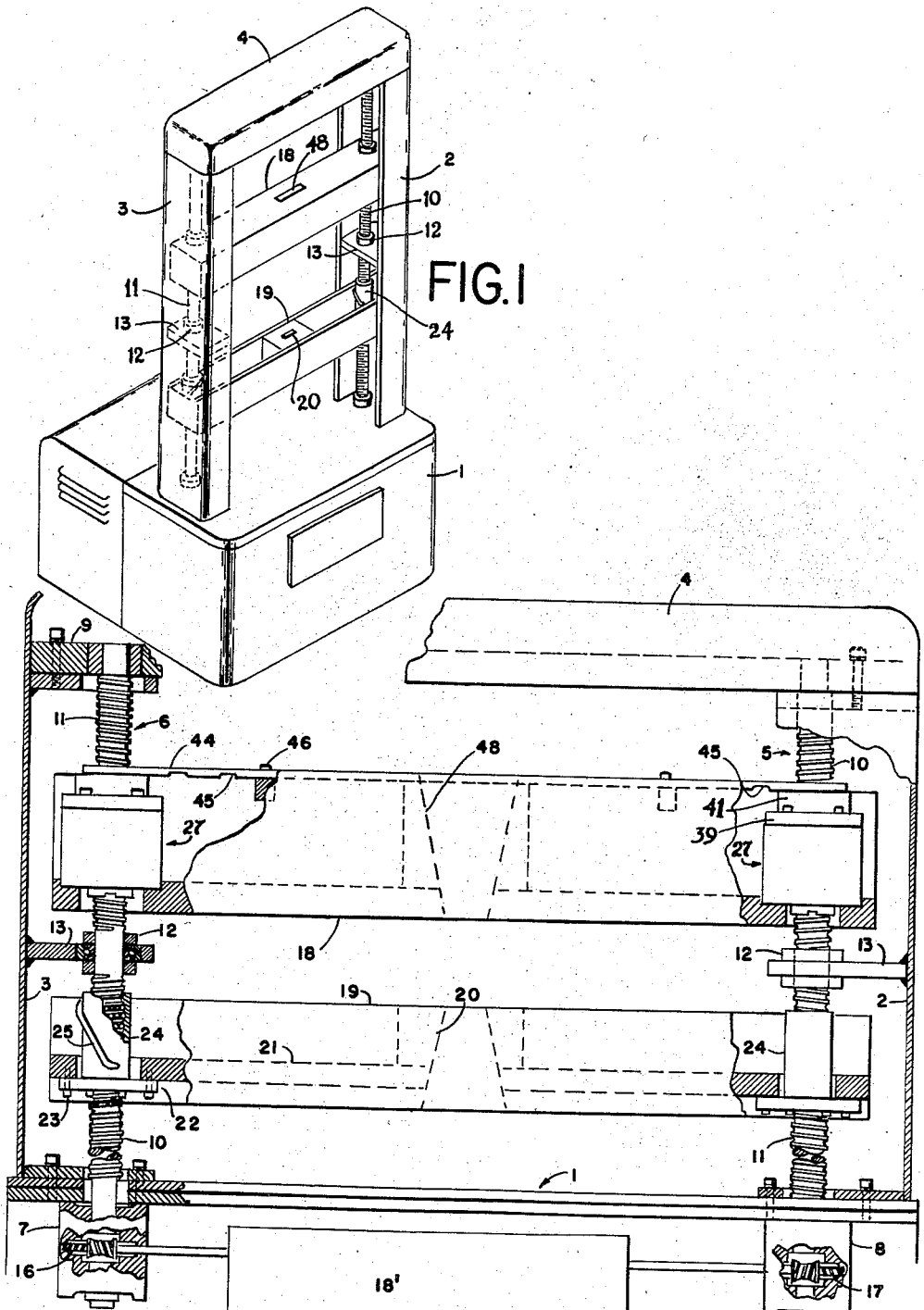
Fig. 1 is a diagrammatic perspective view of my improved testing machine.
Fig. 2 is an enlarged partially sectional view of the straining structure and operating mechanism therefor.

In the particular embodiments of the invention shown herein for purposes of illustrating certain specific forms that the invention might take in practice among possible others I have provided a base 1 upon which is rigidly mounted stationary vertical supporting means, specifically shown as side channels 2 and 3, rigidly connected together by a horizontal member 4. A pair of screws 5 and 6 extend for the full length of the channel members 2 and 3 and are journalled at their lower ends in suitable gear boxes 7 and 8 and at their upper ends in a relatively heavy member 9 forming a part of the cross member 4. The gear boxes have suitable thrust bearings to axially hold the screws. Each screw has right and left hand threaded portions 10 and 11, the hands of the threads being opposite on the upper ends of the screws, and similarly for the lower ends, for the reason that these screws are driven in counter rotational directions by worm and worm gears 16 and 17. The respective worms are located on opposite sides of the worm gears and are driven from a common power source generally indicated at 18'.

The center portion of the screws between their left and right threads is laterally guided by stationary bearings 12 mounted in plates 13 that are suitably secured to the supporting means 2 and 3 by welding or other means. As will be shown later, the cooperative relation of all these elements aids in reducing crosshead weave due to initial warpage in screws and also further absorbs distortion loads when eccentric loads are encountered.

Upper and lower loading crossheads 18 and 19 are supported respectively on the upper and lower threaded portions of the screws. The lower crosshead 19 is of any suitable cross-sectional configuration having a usual specimen grip recess 20 and a substantial horizontal portion 21. The horizontal portion 21 is rigidly secured to a flange 22 by bolts 23 of a ball bearing nut 24. This construction is duplicated at each end of the crosshead 19 and the nuts in each case are of the well-known type having ball-return track 25 so that the balls feed continuously within the nut 24 as the screw rotates. The upper crosshead 18 combines not only ball bearing nuts but also load sensitive cells arranged concentrically of each other so as to be effectively contained witin the vertical depth of the crosshead 18.

To accomplish not only this axial compactness within the vertical depth of crosshead 18 but also to insure maximum freedom from distortion of the load cell as well as to insure uniform loading of the entire ball race I have provided a load cell connected in a particular manner to the crosshead and to the nut so that the load cell and nut are in overlapping or concentric relation generally indicated at 27 which in the specific form disclosed in these figures comprises upper and lower annular members 28 and 29 integrally connected to vertically extending load sensing elements 30 and 31. These individual load sensing elements, preferably of the type shown in Ruge Patent 2,561,318, are of substantially square configuration in elevation with a circular hole 32 in which electrical impedance strain responsive means 33 are disposed. The strain responsive means are preferably of the well-known bonded filament type whereby their electrical resistance changes in response to changes of strains in the surface of the hole 32. Load is transmitted between the annular members 28 and 29 to the load sensing elements by necked-down portions 34 formed by holes 35 drilled parallel to a common radial line and then slotted as at 36. The two load sensing elements 30 and 31 are diametrically located with respect to the annular members and this load cell as a unit is positioned so that the two load sensing portions 30 and 31 are not only symmetrically located about the screw axes but also the axes of all holes 32 are disposed at right angles to the length of the crosshead 18 (i.e., at right angles to a plane containing the screw axes), thereby maintaining the vertical axes of each load sensing element 30 and 31 in the same plane as the neutral axis of their respective screws during loading. The effect of the common planes containing the neutral screw axis and of the concentricity minimizes the possibility of transmitting bending effects from the crosshead 18 to the sensing elements 30 and 31 during loading of a specimen which tends to bend the crosshead with consequent bending of the screws.

The load cell is secured to the lower transverse well of crosshead 18 by capscrews 37 threaded in the lower annular member 29. To transmit load to the load cell a ball bearing nut 38 is secured by threaded connection to a plate 39 which is connected to upper annular member by studs 40. The nut 38 is of the ball return type as shown in 24 and is prevented from rotating by a preloading ring 41 in which a series of set screws 42 are threaded and tightened down against the top of ring 39 thereby firmly forcing the rings 39 and 41 apart to effect a tight frictional contact in the threads between the nut 38 and ring 39. Hence upon rotation of the screws the nut travels along the screw to cause plate 39 to exert a force either downwardly or upwardly on the load sensing elements 30 and 31 depending upon the direction of screw rotation. The entire load cell and nut construction just described is identical at both ends of the upper crosshead 18. To prevent torsional effects being transmitted from the screws to the load cells and also to maintain the two load cells at a predetermined fixed distance apart I provide a single stay plate member 44 whose ends are provided with reduced flexure portions 45. This single member 44 is secured to the crosshead 18 by stud screws 46 and the flexure ends are secured to the locking rings 41 by screws 47. The upper crosshead has a usual tapered specimen grip space 48.

From the foregoing disclosure it is seen that the space between the crossheads 18 and 19 is commonly used both for tension and compression specimens and that because the two crossheads move equally in opposite directions the center of the specimen space remains constant not only at all times but regardless of the specimen length. Hence the operator is able to manipulate specimens of both compression and tension types from one level of operation resulting in maximum saving of effort and time. Additionally, this is conducive to a machine of minimum height. Rotation of the screws in one direction causes both the crossheads to move away from each other for a tension test whereas rotation of the screws in the opposite direction causes both of the crossheads to move toward each other as in a compression test. The counter rotation of the screws causes any frictional forces in all of the nuts to be in the same direction thereby tending to bend each crosshead in a single side direction so as to maintain a uniform action on the specimen throughout loading.

The arrangement of screws and loading crossheads as described so far has the above advantages and additionally is most effective in minimizing bending of the screws under a so-called "skew load." A skew compression test occurs when the specimen axis has its opposite ends offset on opposite sides of the vertical line of the crossheads thereby subjecting the screws to a bending action with a consequent lateral weaving action of the crosshead which induces unwanted misalignment of the crossheads and consequent repetitive bending superimposed on the compression stresses of the specimen. In conventional screw-type testing machines where separate tension and compression spaces are present, a skew test can cause an appreciably greater bending effect in the columns than is possible in my improved machine. In order to make my present machine more effective in minimizing bending of the screws than would be the case in such conventional type machines under eccentric loading, as well as under skew tests, I employ the stationary bearings 12 on each of the screws disposed midway of their length and mounted in bracket plates 13. These central stationary bearings can be effectively used by reason of the crossheads both moving toward or away from the central location of the bearings during application of a test load. Even with the crossheads positioned with a maximum specimen spacing, the bearings 12 cause a very appreciable reduction of bending in the screws under eccentric loads as compared to what would occur for that same loading in the above described conventional type screw-type machine. This is my preferred form of machine because it minimizes bending of the screws under all loading conditions in a most effective manner although under certain circumstances the simplified form of machine with the bearings 12 omitted may be suitable.

Since the elastic stability of a column varies inversely as the square of the column length, the addition of the center bearing provides an increase of stability of four times that of an unsupported screw column when loaded axially in compression as is the case when the specimen is loaded in tension. This permits increased test openings under certain conditions.

In addition to increasing column stability, the center bearing on the screws minimizes bending thereof thereby giving better alignment to the crossheads and reducing weaving of the crossheads during travel under load. In conventional screw type machines bending of the screw columns accompanied by rotation is known to cause the screws to travel in an orbital path of sufficient magnitude to cause crossheads to weave laterally as much as one-quarter of an inch. Heretofore it has been attempted to minimize the misalignment of the crossheads arising from such weaving action by using spherical seats for the specimen holders.

A further advantage of my improved machine is that the maximum capacity test load is confined to the two crossheads and to that portion of the interconnecting screws necessary to accommodate the length of the specimen. For example, in the compressive loading of short columns often referred to as "pack" tests it is particularly important to have a high transverse stiffness of the loading crossheads. Under these conditions it is advantageous to have a minimum length of screw column under load to avoid premature failure of the specimen. The base of the machine supports only the dead weight of parts involved and provides sufficient torque to power the screws.

Figure 5:
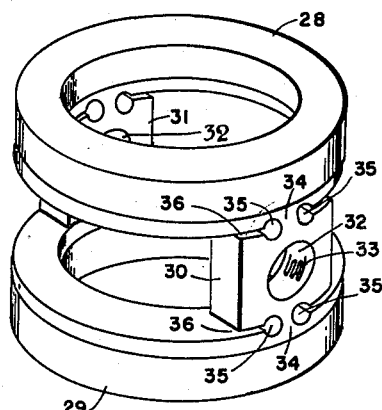
Fig. 5 is a perspective of one form of load cell which may be employed in my improved machine.
Figure 7:
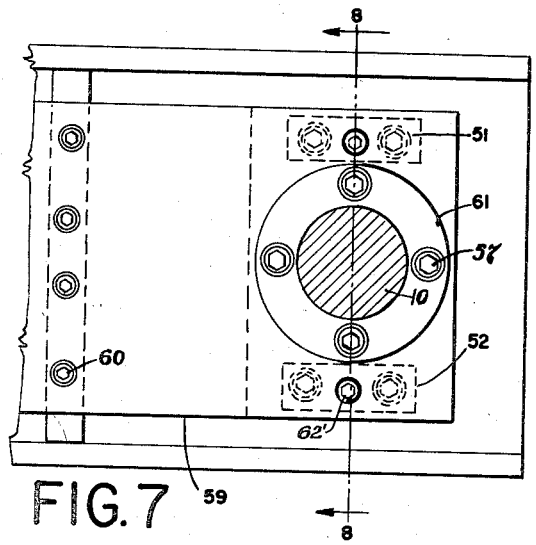
Fig. 7 is a fragmentary plan view of the crosshead of Fig. 6.
Figure 6:
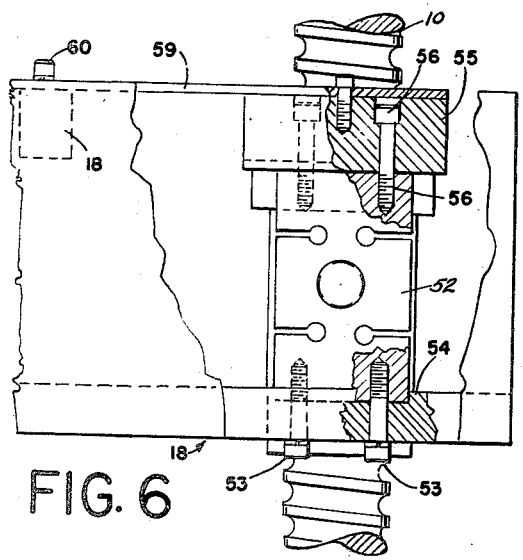
Fig. 6 is a fragmentary side elevation of the combined loading and load sensing crosshead partially broken away to show a modified load cell and screw nut arrangement.
Figure 8:
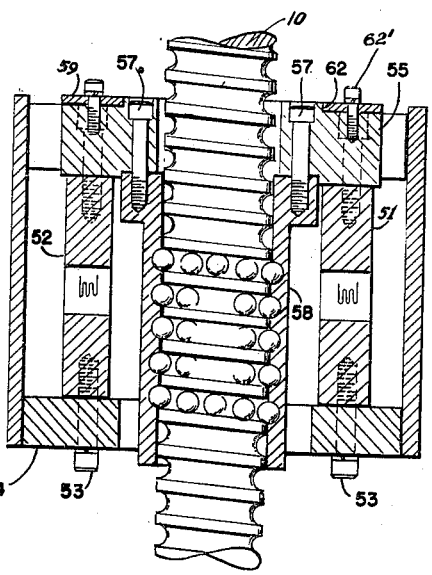
Fig. 8 is a vertical section taken substantially on the line 8—8 of Fig. 7.

*Modification, Figs. 6 to 8:*—In this modification each end of the upper crosshead has similar load cell and nut arrangements comprising load sensing elements 51 and 52 which are of the same general configuration as the sensing elements 30 and 31 of Fig. 5 and hence need not be described in detail except to point out that the elements 51 and 52 are not integrally connected together but rather are supported on and connected by cap screws 53 directly to a lower transverse wall 54 of the combined loading and weighing crosshead 18. The upper ends of the load sensing elements 51 and 52 are connected together by an annular member 55 and cap screws 56. The annular member 55 is also connected by cap screws 57 to a flange of a ball bearing nut 58, it being noted that in this modification as in the other form the nut is connected at its upper end to the upper end of the load sensing elements thereby insuring effective transmission of loading forces from the screw to the crosshead while at the same time obtaining a high degree of sensitive, accurate and stable operation of the load cells.

The diametric location of elements 51 and 52 with respect to the screw axis is the same as in the previous form as is also the right angle relation of the axes of the holes containing the strain gages to the lengthwise axis of the crosshead thereby minimizing bending effects of the screws on the load sensing elements. A single stay plate 59 extends entirely across between the loading screws and is bolted to the crosshead 18 by cap screws 60 and is provided with a circular opening 61 in which extends an annular projection 62 on the ring 55. Cap screws 62' secure the flex plate to the ring 55.

The load cells in this modification, as in the first described arrangement, are thus interposed between the nuts and the specimen engaging portion of the crosshead.

Figure 9:
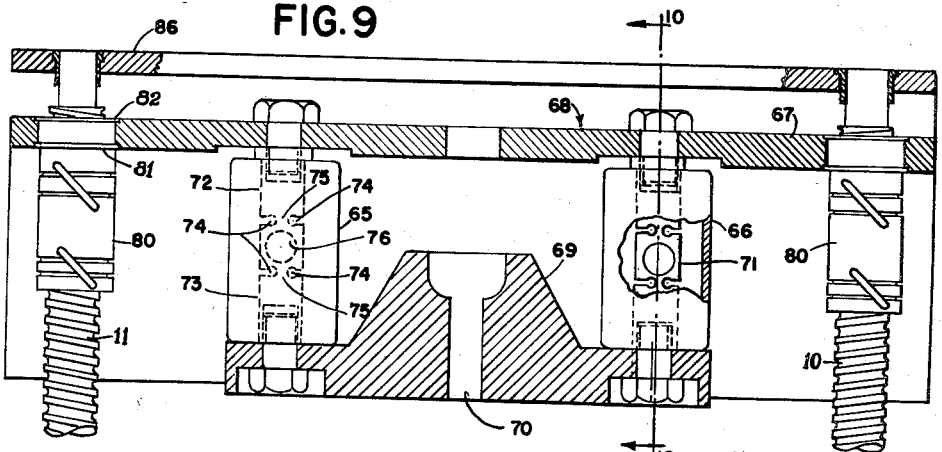
Fig. 9 is a longitudinal sectional view of a modified arrangement of load cells and loading crosshead.
Figure 10:
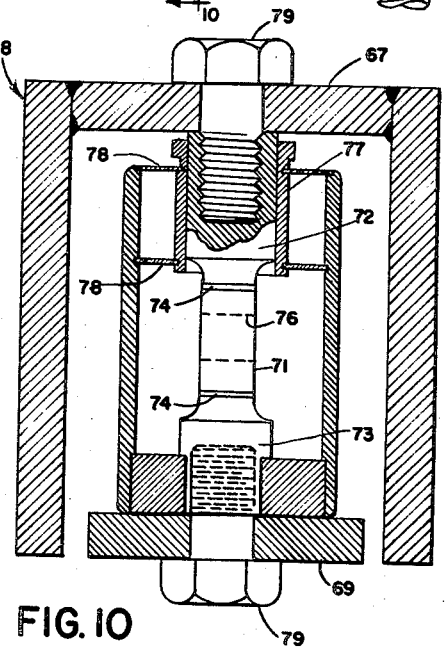
Fig. 10 is a transverse section through the crosshead and a load cell thereof taken on line 10—10 of Fig. 9.
Figure 11:
Fig. 11 is an enlarged fragmentary elevation of one screw and nut to show the manner for holding the latter in the loading crosshead.

*Modification, Figs. 9, 10, 11.*—In this modification a plurality of cells 65 and 66 identical to each other, are moved inwardly from the screws and are supported by the cross portion 67 of the inverted U-shaped loading crosshead 68 while the lower ends of the load cells are secured to a load sensitive portion 69 of such loading crosshead, the sensitive portion being ranged to contain a specimen holder in an opening 70. The load cells in this modification are thus interposed between the nuts and the specimen engaging portion of the crosshead. The load cells are preferably of the type employing the principles of Ruge Patent No. 2,561,318 but differ slightly therefrom in that the strain gage sensing portion 71 is provided with shanks 72 and 73 and separated therefrom by transverse slots 74 to form load transmitting neck portions 75 extending in the direction of the axis of the hole 76 on whose surface strain gages are mounted. The upper shank 72 is laterally supported by a sleeve 77 and a pair of annular flex plates 78. Upper and lower studs 79 securely fasten the shanks 72 and 73 to the loading crosshead 68 and to the load sensitive crosshead 69. It will be seen that in this arrangement the axes of holes 76 in each load cell is at right angles to the lengthwise axis of crosshead 69 thereby insuring that any bending effects transmitted to the load sensing columns 71 will be easily averaged out by suitable cross connections of the strain gages which will be positioned around the surface of the hole in the manner shown in said Ruge patent. By having the two load cells spaced inwardly from the screws, but spaced appreciably apart from each other, the crosshead 68 is subjected to a uniform bending moment in the area between the vertical axes of the load cells and as a result the load cells permit an appreciable offset load position of the specimen with negligible effect on accuracy.

The ball bearing nuts 80, Fig. 11 are held in the crosshead 68 by a pair of annular spring members 81 and 82 which are suitably vertically split at one point to permit the same to be sprung around the outside of the nut 80 and into grooves 83 and 84 in the surface of the nut. One surface of the annular grooves is tapered complementary to correspondingly tapered surfaces on the annular members. The lower annular ring seats against the bottom of the annular groove 84 while the upper ring is spaced from the bottom of groove 83 thereby allowing the upper ring to constantly exert a clamping action to tighten the rings against the crosshead member 67 and prevent axial shifting of the nut which is of the same ball return type as described in the other forms of my invention.

The modifications shown in Figs. 9 to 11 have the advantages previously described for the other forms such as minimum effects on the load cells arising from bending of the crosshead, this by reason of the load cells having the axes of the hole 76 disposed at right angles to the lengthwise axis of the crosshead whereby bending in either upward or downward directions will be averaged out by the action of the sensing portion of the load cell. This arrangement also eliminates the need for a flex plate such as 44 in Fig. 3 in that the annular flexures 78 of the load cells perform the function of laterally stabilizing the sensing columns. A stationary member 86, Fig. 9, has bearings in which the upper ends of the screws are journalled and are suitably supported on the upper ends of the supporting means 2 and 3.

Figure 3:
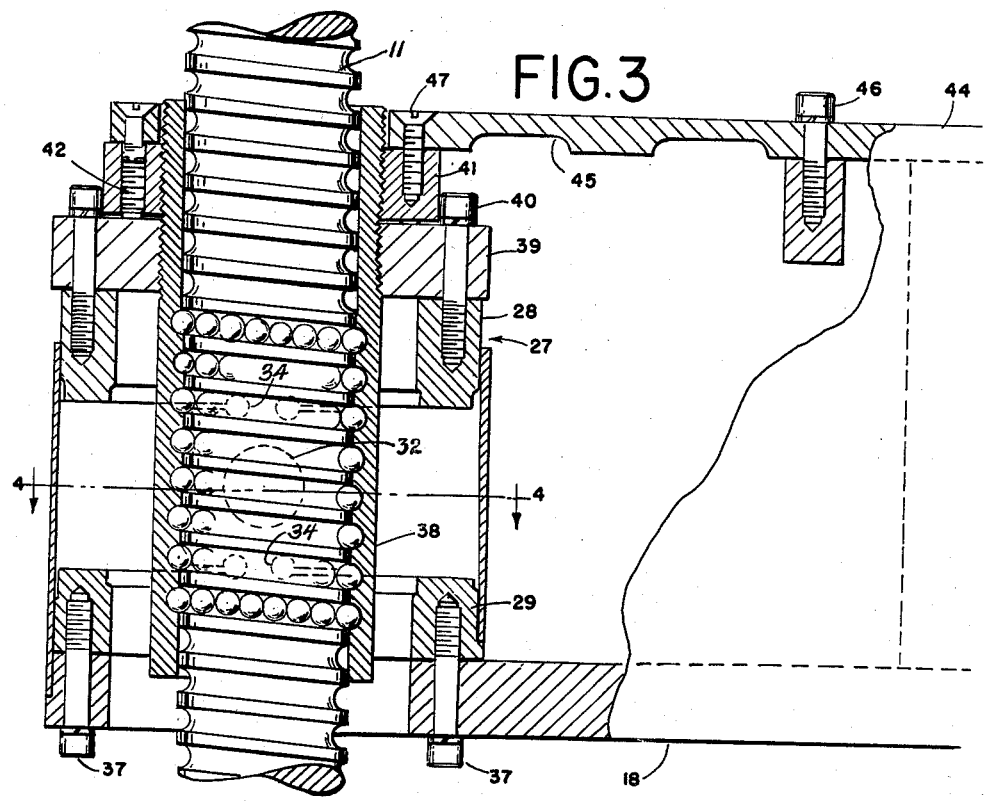
Fig. 3 is an enlarged sectional view of one of the screws with a loading nut and load sensing cell.
Figure 4:
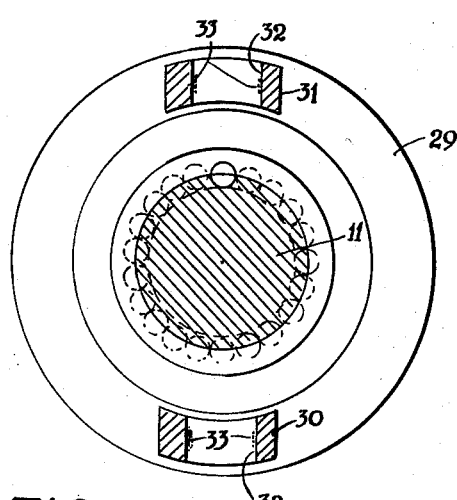
Fig. 4 is a cross-sectional view taken substantially on the line 4—4 of Fig. 3.

It is to be noted that in all forms of the invention disclosed herein, the crossheads have a portion constituting a specimen engaging member such as the middle section of the crossheads 18 and 19, Fig. 2 or 69, Fig. 9. The load sensing means have load receiving and load transmitting portions which are the upper and lower ends such as 28 and 29, Fig. 5. Means are then provided to connect these portions respectively to one pair of nuts and to the specimen engaging member which is operated by such nuts. This means comprises the connections between one end of the load sensing means and the nut and that portion of the crosshead structure connected to the other end of the load sensing means as shown in Fig. 3 or, as shown in Fig. 9 the crosshead structure 68 connects one end of the load sensing means to the pair of nuts and the other end of the sensing means is connected by capscrews to the member 69.

From the foregoing disclosure of the several modifications it is seen that I have provided an extremely simple, compact, and highly stable screw type materials testing machine of the type for testing both compression and tension specimens and that permits a common space for both types of specimens thereby reducing the height of the machine as well as providing maximum convenience of operation with a minimum loaded length of the screws. This is combined with minimum misalignment of the upper and lower crossheads through a combination of elements for minimizing weaving of the crossheads normally produced by bending of the loading screws travelling in an orbital path and for minimizing the transmission of bending effects from the screws to the load sensing elements. While the machine has been referred to as a vertical one, the term "vertical" is merely relative inasmuch as the machine may be disposed horizontally.

It will of course be understood that various changes in details of construction and arrangement of parts may be made by those skilled in the art without departing from the spirit of the invention as set forth in the appended claims.

I claim:

1. A materials testing machine of the compression-tension type having a pair of loading screws each of which is provided with upper and lower threads of opposite hands, nuts, one on each of the upper set of threads and one on each of the lower set of threads, a pair of members for engaging either a tension or compression specimen located in the single space between such members, load sensing means having load receiving and transmitting portions, means connecting said portions respectively to one pair of said nuts and to one of said specimen engaging members so as to transmit specimen load through said sensing means, and means for rotating said screws in one direction so that the specimen engaging members move toward each other to apply a compression load on a specimen positioned between such members and to rotate the screws in the opposite direction to move such members away from each other to apply a tension load to a specimen similarly positioned, whereby the specimen center for both types of specimens remains constant at all times and the portion of the length of the screws subject to axial load is substantially equal only to the length of a specimen under test regardless of its length.

2. The combination set forth in claim 1 further characterized in that the load sensing means is deflectable about axes transverse to a plane containing the screw axes, thereby to minimize distortions during loading of a specimen of the load sensing means arising from bending of the screws and of the specimen member with which the sensing means is associated.

3. The combination set forth in claim 1 further characterized in that the load sensing means includes vertically extending strain sensing elements disposed on each side of each screw in planes parallel to a plane containing the screw axes, and said strain sensitive elements being disposed so as to be deflectable about axes transverse to said plane which intersect the screw axes.

4. A materials testing machine of the compression-tension type having a pair of loading screws each of which is provided with upper and lower threads of opposite hands, nuts, one on each of the upper set of threads and on each of the lower set of threads, a pair of crossheads respectively connected to the upper and lower sets of nuts, a specimen engaging member disposed adjacent to and separate from one of said crossheads, load sensing means disposed between said member and its adjacent crosshead, said specimen engaging member and the other crosshead having provision for engaging either a tension or compression specimen located in the single space between the pair of crossheads, and means for rotating said screws in one direction so that the crossheads move toward each other to apply compression load on a specimen positioned between such crossheads and to rotate the screws in the opposite direction to move the crossheads away from each other to apply a tension load to a specimen similarly positioned, whereby the specimen center for both types of specimens remains constant at all times and the portion of the length of the screws subject to axial load is substantially equal only to the length of a specimen under test regardless of its length.

5. The combination set forth in claim 1 further characterized by the provision of bearings through which the screws extend and said bearings being located thereon between the upper and lower right and left hand screw threads, and means for laterally rigidly supporting said bearings thereby to effect elastic stability of the screw columns and a stabilizing action against bending of the screws during loading of a specimen.

6. The combination set forth in claim 1 further characterized by the provision of bearings through which the screws extend and said bearings being located thereon between the upper and lower right and left hand screw threads, means for laterally rigidly supporting said bearing thereby to effect elastic stability of the screw columns and a stabilizing action against bending of the screws during loading of a specimen, and means connected to said bearing supporting means for laterally supporting the screws at both their upper and lower ends.

References Cited in the file of this patent

UNITED STATES PATENTS

| | | |
|---|---|---|
| 212,107 | Olsen | Feb. 11, 1879 |
| 1,573,521 | Moran | Feb. 16, 1926 |
| 2,176,722 | Sanner | Oct. 17, 1939 |